United States Patent [19]

Shah et al.

[11] 4,280,897

[45] Jul. 28, 1981

[54] REMOVAL OF CONTAMINATING METALS FROM FCC CATALYST BY $NH_4$ CITRATE CHELATES

[75] Inventors: Syed M. Shah, Berwyn; Hosheng Tu, Shorewood, both of Ill.

[73] Assignee: UOP Inc., Des Plaines, Ill.

[21] Appl. No.: 153,806

[22] Filed: May 27, 1980

[51] Int. Cl.$^3$ .............................................. C10G 11/00
[52] U.S. Cl. ................................ 208/113; 208/52 CT; 208/120; 252/411 R; 252/412; 252/414
[58] Field of Search ................................ 208/113–120, 208/52 CT; 252/411 R, 413, 414, 420

[56] References Cited

U.S. PATENT DOCUMENTS

| 2,693,455 | 11/1954 | Smith et al. | 208/52 CT |
| 2,921,018 | 1/1960 | Helmers et al. | 208/114 |
| 3,252,918 | 5/1966 | Disengna et al. | 252/416 |
| 3,324,044 | 6/1967 | Oberhofer | 252/413 |
| 3,663,429 | 5/1972 | Vallino | 208/108 |
| 4,013,546 | 3/1977 | Suggitt et al. | 252/415 |
| 4,025,458 | 5/1977 | McKay | 252/416 |
| 4,148,750 | 4/1979 | Pine | 252/416 |

*Primary Examiner*—Delbert E. Gantz
*Assistant Examiner*—G. E. Schmitkons
*Attorney, Agent, or Firm*—James R. Hoatson, Jr.; Louis A. Morris; William H. Page, II

[57] ABSTRACT

A contaminating metal on a cracking catalyst used for the cracking of hydrocarbons is removed by contacting the catalyst with a chelating agent which forms chelates with the contaminating metal. The chelates containing the contaminating metal may be readily separated from the catalyst.

4 Claims, No Drawings

REMOVAL OF CONTAMINATING METALS FROM FCC CATALYST BY NH₄ CITRATE CHELATES

BACKGROUND OF THE INVENTION

The field of art which the claimed invention pertains is the catalytic cracking of hydrocarbons. More specifically, the claimed invention relates to a process for the removal of contaminating metals from a fluidized cracking catalyst.

DESCRIPTION OF THE PRIOR ART

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the most important processes of this nature is the fluid catalytic cracking process for the conversion of relatively high-boiling hydrocarbons to lighter hydrocarbons boiling in the heating oil or gasoline (or lighter) range. The hydrocarbon feed is contacted in one or more reaction zone with the particulate cracking catalyst maintained in a fluidized state under conditions suitable for the conversion of hydrocarbons.

A common problem in the fluid catalytic cracking process is the gradual deterioration of the catalyst due to the deposition on the catalyst of metal contaminants contained in the hydrocarbon feed, such as nickel, vanadium and iron. These deposited metal contaminants increase the production of hydrogen, light gases and coke at the expense of the highly desired gasoline.

The art teaches many techniques for dealing with these undesirable metal contaminants. Such techniques can be divided into two broad categories, one being the passivation of the contaminants by reacting the catalyst with a passivating agent, which converts the metal contaminants to a relatively innocuous form, and the other being the physical removal of the contaminants from the catalyst. Examples of techniques falling within the former category are as taught or claimed in U.S. Pat. Nos. 2,758,097 (reaction with phosphorus pentoxide); 3,711,422 (reaction with an antimony compound); and 4,025,458 (reaction with chemical complexes containing antimony). Examples of techniques falling within the latter category are as taught or claimed in U.S. Pat. Nos. 3,252,918 (treatment with oxygen and nitrogen oxide which may be followed by sulfur vapor and chlorine, the object being to volatilize or solubilize the metals); 3,324,044 (contact with acidic aluminum salt); 4,013,546 (contacting with chloride at certain conditions to form volatile metal chlorides); 4,014,815 (sulfiding the metal contaminants to a soluble sulfide with free sulfur vapor or liquid); 4,163,709 (sulfiding followed by oxygen treatment at certain conditions to convert the metals to a disposable form).

There is also art that teaches reduction and sulfiding treatment of non-fluidized moving catalyst beds to temper the activity of certain desired metals, such as those contained in Group VIII of the Periodic Table, intentionally added to the catalyst. The processes in which these moving catalyst beds are used include processes requiring the introduction of hydrogen, such as hydrocracking and reforming. U.S. Pat. No. 3,838,038 is an example of such art teaching reduction and sulfiding of a non-fluidized catalyst containing certain desired metals.

We have found a process for removing an undesired metal contaminant on a fluid cracking catalyst for use in a fluidized cracking system by forming readily removable chelates containing such metals.

SUMMARY OF THE INVENTION

It is, accordingly, a broad objective of our invention to achieve removal of undesired metal contaminants on a fluid catalytic cracking catalyst.

In brief summary, our invention is a catalytic cracking process for converting a hydrocarbon feedstock contaminated with a metal comprising nickel, vanadium, iron or copper, to lower boiling hydrocarbon products. The feedstock is contacted with a cracking catalyst in a cracking reaction zone wherein the cracking catalyst is poisoned and contaminated by the metal present in the feedstock. At least a portion of the metal contaminating the cracking catalyst is removed by (a) contacting the metal contaminated catalyst with a chelating agent to effect a reaction between the contaminating metal and the chelating agent, thereby forming chelates the central atoms of which comprise the contaminating metal, and the ligands of which are derived from molecules of the chelating agent; and (b) separating the chelates from the catalyst, thereby obtaining a catalyst of reduced contaminating metal content and improved catalytic activity.

Other objectives and embodiments of our invention encompass details about catalyst composition, flow schemes, and conditions conducive to the removal of metal contaminants, all of which are hereinafter disclosed in the following discussion of each of the facets of our invention.

DESCRIPTION OF THE INVENTION

Catalysts which can be used in the process of this invention include those known to the art as fluidized catalytic cracking catalysts. Specifically, the high activity aluminosilicate or zeolite-containing catalysts can be used and are preferred because of their higher resistance to the deactivating effects of high temperatures, exposure to steam, and exposure to metals contained in the feedstock. The well-known amorphous silica alumina catalysts may also be used.

Charge stocks used in the catalytic cracking process are mentioned here because contaminant metals such as nickel, iron, and vanadium found in the charge stock usually influence the regeneration operation, catalyst selectivity, catalyst activity and the fresh catalyst makeup rate required to maintain a constant activity. Metals contained in the feed are deposited on the catalyst and not only change its selectivity in the direction of less gasoline and more coke and light gas in a given reactor system but tend to deactivate the catalyst.

In a typical FCC process flow, finely divided regenerated catalyst leaves the regeneration zone at a certain temperature and contacts a feedstock in a lower portion of a reaction riser zone. While the resulting mixture passes up through the riser, conversion of the feed to lighter products occurs and coke is deposited on the catalyst. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separated hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feedstock to the reaction riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst passes into the lower portion of the disengaging space and eventually leaves that zone passing through stripping means in which a stripping gas, usually steam, counter-currently contacts the spent catalyst purging adsorbed and interstitial hydrocarbons from the catalyst. The spent catalyst containing coke leaves the stripping zone and passes into a regeneration zone, where, in the presence of fresh regeneration gas, combustion of coke produces regenerated catalyst and flue gas containing carbon monoxide, carbon dioxide, water, nitrogen and perhaps a small quantity of oxygen. Usually, the fresh regeneration gas is air, but it could be air either enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, which is the preferred mode of operation, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone and, as previously mentioned, contacts the feedstock in a reaction zone.

One of the major obstacles in the processing of FCC feedstocks, such as residual stocks, which are contaminated with the aforementioned undesirable metal contaminants, is the harmful influence of even minute amounts of these metals. These metals and in particular nickel will contribute a dehydrogenating activity to the catalyst on which they deposit which is responsible for the production of additional hydrogen and coke on the catalyst. The presence of large quantities of these metals also blocks access to cracking sites and can lower the activity of the catalyst.

While the easiest approach taught by the art for dealing with the metals contamination problem is to neutralize or passify the metals present on the catalyst, such a procedure does not necessarily aid the activity of the catalyst since the metals still block the catalytic sites. Removal of the contaminating metals as achieved by our process is therefore highly preferred.

We have found that contacting the fluid cracking catalyst with a chelating agent will, upon reuse of the catalyst, achieve a substantial lessening in the formation of hydrogen, light hydrocarbon gas and coke in the catalytic reactor. We have observed that in fact the chelating agent does substantially reduce the amount of metal contaminant on the catalyst. The magnitude of the lessening of the undesirable FCC reaction, however, are completely unexpected in view of the relatively smaller magnitude of the metals reduction.

The following chemical structure is illustrative of a typical chelate, i.e. one in which the ligands are derived from acetylacetone and the central atom comprises nickel:

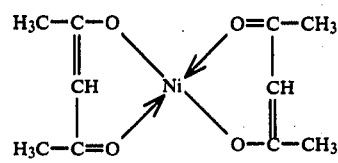

The contacting of the chelating agent with the metals contaminated catalyst is preferably effected by removing the catalyst from the catalyst regeneration zone of the process, admixing the catalyst with the chelating agent in a contacting zone at ambient temperature and pressure, separating the catalyst from the chelate and unreacted chelating agent, and returning the catalyst to the process, preferably near the inlet of the catalyst return line from the regenerator to the reactor. Depending on the chelating agent used, it is sometimes advantageous to use the chelating agent in the form of a solution with a suitable solvent, i.e. a solvent in which the chelating agent is highly soluble. For example, when the chelating agent is acetylacetone or a halogenated acetylacetone it is preferred because of the very high vapor pressure of such agents to use it in the form of an ethanol solution comprising as high as 80% ethanol. For further example, chelating agents such as ethylene diamine tetracetic acid, diethylene triaminepeta acetic acid, or ammonium citrate would best be used in aqueous solution.

Chelates formed with any of the above chelating agents in accordance with this invention may be separated from the catalyst by a distillation technique, since the chelates are characterized by substantial thermal stability and volatility. Such distillation techniques include heating the chelate containing catalyst to the boiling point of the chelate either at atmospheric or sub-atmospheric pressure, or steam distilling the chelate at a temperature lower than its boiling point.

Another possible method for contacting the chelating agent with the metals contaminated catalyst is to add it to the feedstock prior to introducing the feedstock to the cracking reaction zone, or add it to the steam used for stripping the catalyst prior to its circulation to the regeneration zone. This method requires that the chelating agent selected is one which when contacted with the metal contaminated catalyst will form a chelate with the contaminating metal which sublimes at a temperature of from about 250° C. to about 500° C. with minimal decomposition. An example of such a chelating agent is 8-hydroxyquinolate. Separation of the chelate from the catalyst is effected by its vaporization in the cracking reaction zone followed by its being carried out of the zone with the reaction products. The chelate would then be recovered from one of the liquid streams obtained from the FCC main fractionator.

Chelating agents used to form any of the above-mentioned chelates may be recovered from the respective chelates by mixing the chelate with an aqueous solution of a strong mineral acid, thereby inducing a chemical reaction between the acid and chelate to form a solution of the chelating agent and a salt of the contaminating metal. The chelating agent may then be distilled off from the mixture to effect the recovery.

The following non-limiting examples are illustrative of the process of our invention and advantageous effect derived therefrom.

EXAMPLE I

A control sample was obtained, hereinafter referred to as "Catalyst A", comprising an equilibrium FCC catalyst containing about 30% rare earth cation exchanged Y zeolite and about 70% clay matrix. The control also contained 0.48% nickel freshly impregnated therein by conventional impregnation techniques utilizing an aqueous solution of a nickel salt, followed by high temperature calcination.

Catalyst A was then treated in accordance with the process of this invention. 25 grams of Catalyst A was admixed in a flask containing 500 ml of a solution containing 5 wt. % ammonium citrate in deionized water. The flask was gently shaken for 1 minute every 15 minutes over a period of 2 hours. The liquid was then decanted from the flask and the catalyst was dried in an oven at 105° C. for several hours to obtain the treated catalyst, hereinafter referred to as "Catalyst B". The nickel content of Catalyst B was found to be 0.37%, a substantial reduction from the nickel content of Catalyst A.

EXAMPLE II

Catalysts A and B were each tested in an FCC microactivity test pilot plant. For each test 4.0 grams of catalyst on a volatile free basis was used in the plant with 1.28 grams of vacuum gas oil as a feedstock. The reactor temperature was 900° F. Following are the results obtained:

| Catalyst | A | B |
|---|---|---|
| FCC MAT Evaluation | | |
| Wt. % Conversion | 63.3 | 60.1 |
| Products Selectivity | | |
| (Wt. % of Products) | | |
| $C_2^-$ | .02 | .02 |
| Total $C_3$ | .06 | .05 |
| Total $C_4$ | .13 | .11 |
| $C_5$ - EP Gasoline | .71 | .77 |
| Spent Catalyst Carbon | .08 | .05 |
| Dry Gas $C_2$ - Yield, scf/bbl | 457.02 | 266.71 |
| Hydrogen Yield, scf/bbl | 414.61 | 232.98 |

The data shows that the product yield distribution for Catalyst B is superior to Catalyst A. The results for Catalyst B show higher gasoline product selectivity and less spent catalyst carbon selectivity. More impressive, however, is the amazing reduction in dry gas and hydrogen yield which is indicative of metal poison function. The lower dry gas and hydrogen yield for Catalyst B are excellent indicators of the catalyst performance improvement achieved by the innovative technique of our invention.

We claim as our invention:

1. A catalytic cracking process for converting a hydrocarbon feedstock, contaminated with a metal comprising nickel, vanadium, iron or copper, into lower boiling hydrocarbon products by contacting said feedstock with a cracking catalyst in a cracking zone wherein said cracking catalyst is poisoned and contaminated by said metal present in said feedstock, at least a portion of said metal contaminating said cracking catalyst being removed by:
   (a) contacting said metal contaminated catalyst with an aqueous solution of ammonium citrate to effect a chelation of said contaminated metal with said ammonium citrate, the central atom of said chelation comprising nickel, vanadium, iron or copper and the ligands of said chelation comprising molecules of said ammonium citrate; and
   (b) separating said chelated metal and ligands from said cracking catalyst to substantially reduce the quantity of hydrogen production in said cracking zone.

2. The process of claim 1 wherein said contacting of step (a) is effected in a contacting zone at ambient temperature and pressure with catalyst comprising regenerated metal contaminated catalyst removed from the catalyst regeneration zone of said process, said catalyst being returned to said process following the separation of said catalyst from said chelates in accordance with step (b).

3. The process of claim 1 wherein the separation of step (b) is effected by distillation of said chelating agent.

4. The process of claim 1 wherein said ammonium citrate is recovered for reuse from said separated chelate of step (b) by mixing said chelate with an aqueous solution of a strong mineral acid, thereby inducing a chemical reaction between said acid and said chelate to form a solution comprising said chelating agent and a salt of said contaminating metal, and distilling off said chelating agent from said mixture to effect said recovery of said ammonium citrate.

* * * * *